United States Patent
Kuo

(10) Patent No.: US 7,571,449 B2
(45) Date of Patent: Aug. 4, 2009

(54) DISK CHANGER DEVICE AND BARRIER MECHANISM THEREOF

(75) Inventor: Tsung-Jung Kuo, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 11/254,687

(22) Filed: Oct. 21, 2005

(65) Prior Publication Data

US 2006/0090175 A1     Apr. 27, 2006

(30) Foreign Application Priority Data

Oct. 22, 2004   (TW) .............................. 093132192 A

(51) Int. Cl.
G11B 17/04       (2006.01)
G11B 17/03       (2006.01)

(52) U.S. Cl. .......................... 720/619; 360/71; 360/91; 720/615; 720/632

(58) Field of Classification Search ................ 720/619, 720/615, 632; 360/71, 91; 369/30.57, 30.59, 369/30.85, 30.89
See application file for complete search history.

(56) References Cited

U.S. PATENT DOCUMENTS

| | | | | |
|---|---|---|---|---|
| 5,414,679 A | * | 5/1995 | Menke | .................... 369/30.87 |
| 5,515,356 A | * | 5/1996 | Lee | .......................... 369/30.45 |
| 5,991,256 A | * | 11/1999 | Nonaka et al. | ........... 369/30.52 |
| 6,014,353 A | * | 1/2000 | Kong et al. | ............... 369/30.84 |
| 6,169,713 B1 | * | 1/2001 | Silverstein | ............... 369/30.79 |
| 6,804,080 B1 | * | 10/2004 | Gavit et al. | .................... 360/92 |
| 2003/0039177 A1 | * | 2/2003 | Malul et al. | ................. 369/30.6 |

* cited by examiner

*Primary Examiner*—Angel Castro
*Assistant Examiner*—Christopher R. Magee
(74) *Attorney, Agent, or Firm*—Muncy, Geissler, Olds & Lowe, PLLC

(57) ABSTRACT

A barrier mechanism, which is often utilized in a disk changer device, is disclosed herein, in which the barrier mechanism includes two wheels and a barrier belt loop. The two wheels are respectively installed on a top terminal and a bottom terminal of an edge of the disk insertion opening of the magazine. A barrier belt loop which is used for selectively traverse one of the plurality of disk holding members, includes an inner section with a traversing recess carved therein. The inner section is adjacent to the disk insertion opening of the magazine of the disk changer device, and the mechanical coupling between the barrier belt loop and the processing mechanism enables the traversing recess constantly aligned with the optical pick-up unit. Accordingly, the traversing recess is horizontally aligned with the predetermined disk holding member, thereby the procedure enables the drafting unit to extract the predetermined disk holding member through the traversing recess into the optical pick-up unit.

8 Claims, 8 Drawing Sheets

DISK CHANGER DEVICE AND BARRIER MECHANISM THEREOF

BACKGROUND OF THE INVENTION (1) Field of the Invention

The invention relates to a disk changer device, and more particularly to the protection mechanism of the disk changer device.

(2) Description of the Prior Art

Because the cost of the optical accessible media, such as optical disk or compact disk (CD), is very low, and it is very easy as well as convenient to manipulate the optical drive to access the data from the optical disk. The optical drive that can read/write date from/to the optical drive is much more popular than ever, in addition, the device that can store many disks provided for automatic selection and sequential access is call as a multi disk changer.

Please refer to FIG. 1 and FIG. 2, the isometric view of a conventional multi disk changer 2 is shown in FIG. 1, and the isometric view of a conventional processing mechanism 6 used in a traditional changer 2 is shown in FIG. 2. The disk changer 2 includes a magazine 4 and a processing mechanism 6 that composed of a drafting unit 602, an elevating unit 604, and an optical pick-up 606, besides, the magazine 4 includes a plurality of disk holding member 402. The three units mentioned above are mechanically coupled, in detail, the elevating unit 604 are loaded with the drafting unit 602 and the optical pick-up unit 606. When the elevating unit 604 vertically moves to a predetermined position corresponding to one of the plurality of disk holding member 402, then the drafting unit 602 horizontally draft the predetermined disk holding member 402 to a position corresponding to the optical pick-up unit 606, and subsequently, the disk 8 on the predetermined disk holding member 402 is ready to be accessed by the optical pick-up unit 606.

Please refer to FIG. 3, the cross sectional view of the disk changer 2 in longitude is illustrated, it shows the normal situation in the conventional disk changer 2. All the disk holding members 402 are designed to align each other and kept in the magazine 4 in a way that prevents these disk holding members from hindering the vertical route of the processing mechanism 6. Only when the processing mechanism 6 drafting a predetermined disk holding member 402a, then the corresponding disk holding member 402a will be drafted away from its original position(as shown in FIG. 3), and the predetermined disk holding member 402a reaches the processing mechanism 6.

In some practical situations, especially when the disk changer device 2 is loaded on a vehicle, it is not avertable that shock from various direction will influence the placement of the disk holding member 402 within magazine 4. Accordingly, in the situation mentioned above, even if the processing mechanism 6 is not going to draft any specific disk holding member 402, one of the plurality of disk holding member 402 still could probably be shaken off from its' original position, and may be left on the way of the vertical path of the movement of the processing mechanism 6. Subsequently, once the processing mechanism 6 move vertically, it will collide with the disk holding member 402 in its' way, and thus the collision will result in a serious damage to the corresponding parts and mechanisms.

For the aforementioned disadvantages resulted from the conventional disk changer, it is fundamental to avoid the disk holding member from been shaken off its' original position in magazine 4, which may result severe damage to the disk changer 2.

SUMMARY OF THE INVENTION

Accordingly, it is one object of the present invention to prevent the plurality of disk holding member from being unexpected shaken off its' original position in the magazine.

The present invention is related to a barrier mechanism that often utilized in a disk changer device. The disk changer includes a magazine and a handling mechanism, wherein the magazine includes a plurality of disk holding member, in addition, the processing mechanism includes a drafting unit, an elevating unit, and an optical pick-up unit. The elevating unit is loaded with the drafting unit and the optical pick-up unit, specifically, the elevating unit is used to vertically move the drafting unit and the optical pick-up unit to a predetermined position corresponding to a predetermined disk holding member of the plurality of disk holding member. Then the drafting unit is used to horizontally draft the predetermined disk holding member to a position corresponding to the optical pick-up unit. The barrier mechanism includes two wheels and a barrier belt loop.

The two wheels are respectively installed on a top terminal and a bottom terminal on an edge in depth of the disk insertion opening of the magazine of the disk changer device.

According to one preferred embodiment of the present invention, the barrier belt loop is used to selectively traverse one of said plurality of disk holding members, in detail, the barrier belt loop is slidably engaged to the two wheels, wherein a traversing recess is carved into the inner section of the barrier belt loop. The inner section mentioned above is adjacent to the disk insertion opening of the magazine. The mechanical coupling between the barrier belt loop and the processing mechanism enables the traversing recess constantly aligned with the optical pick-up unit, thus the traversing recess can move upwardly/downwardly in accordance with the movement of the processing mechanism.

According to one preferred embodiment of the present invention, the processing mechanism vertically moves to a position, the processing mechanism enables the optical pick-up unit and the predetermined disk holding member to be horizontally coplanar, then the traversing recess is horizontally aligned with the predetermined disk holding member, thereby the procedure enables the drafting unit to extract the predetermined disk holding member through the traversing recess into the optical pick-up unit.

When the disk changer device is utilized by a mobile stereo, e.g., a vehicle base stereo, the shaking to the disk changer device is unavoidable, and the disk holding member in the magazine of the disk changer device is often shaken out from within the magazine to a position out of the magazine unexpectedly. To prevent such situation, the present invention provides a barrier mechanism utilizing barrier mechanism to block the disk holding member in the magazine, meanwhile, through the vertical movement of the traversing recess on the barrier mechanism, the disk changer device can selectively extract any one of the plurality of disk holding members.

BRIEF DESCRIPTION OF THE DRAWINGS

The present invention will now be specified with reference to its preferred embodiment illustrated in the drawings, in which FIG. 1 schematically illustrates the isometric view of a disk changer in the prior art.

DESCRIPTION OF THE PREFERRED EMBODIMENT

Figure 1:
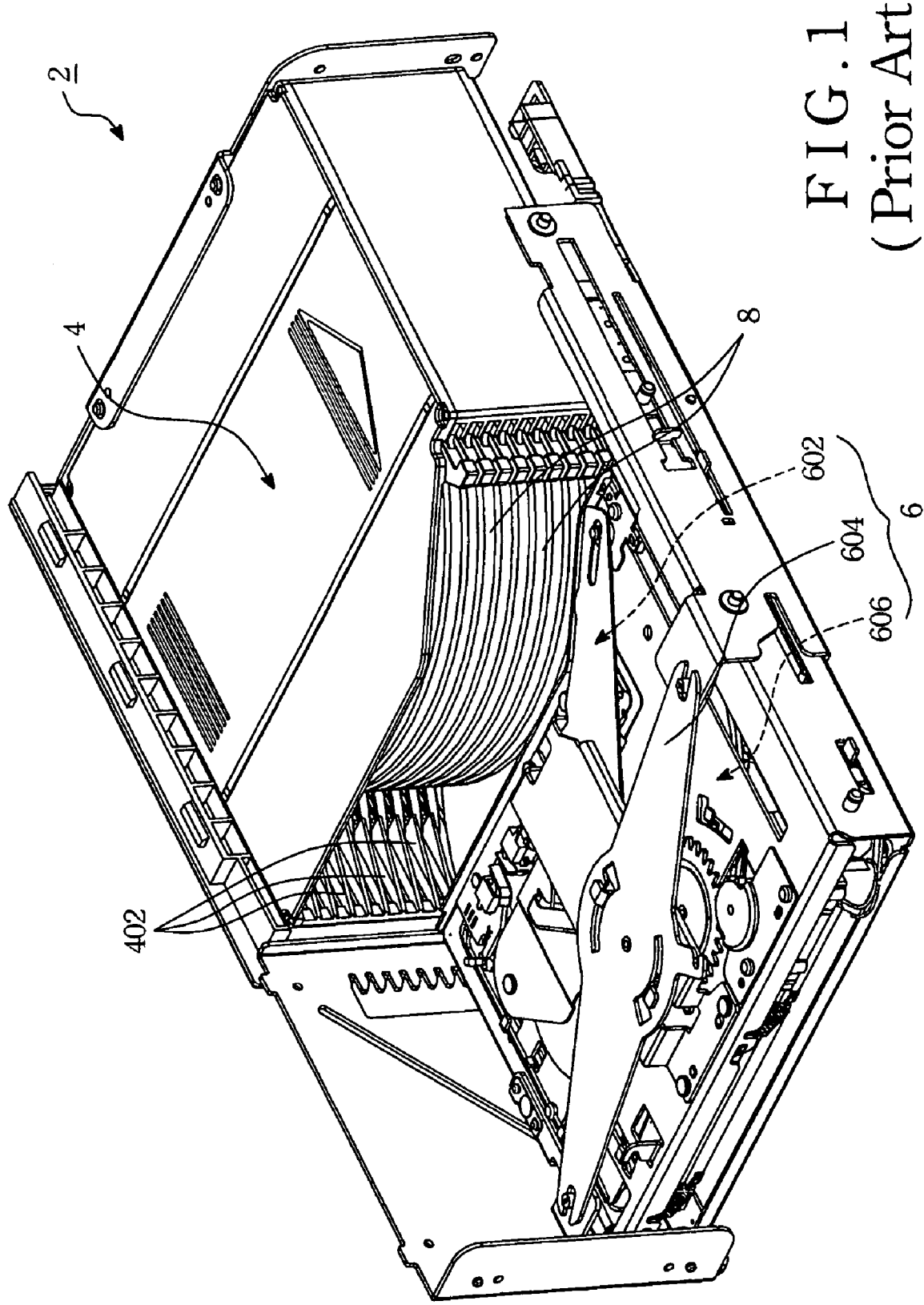
Figure 2:
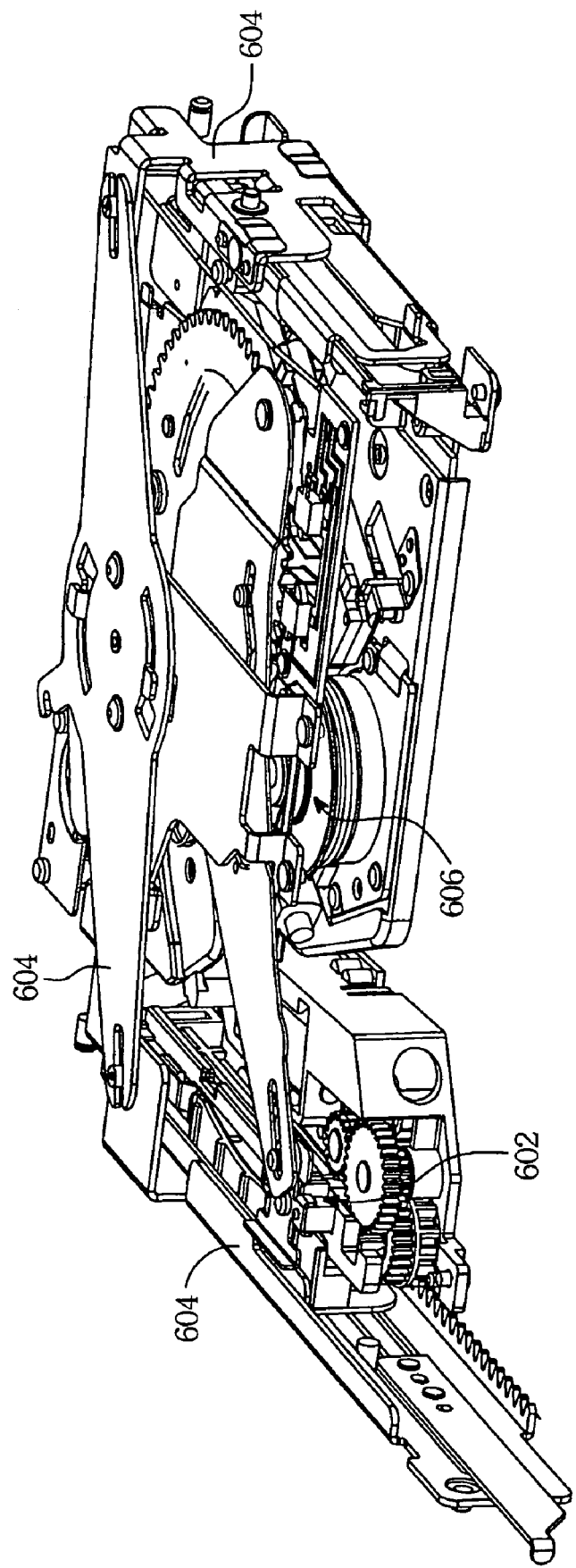
FIG. 2 schematically illustrates the isometric view of a processing mechanism in the prior art utilized in a disk changer.
Figure 3:
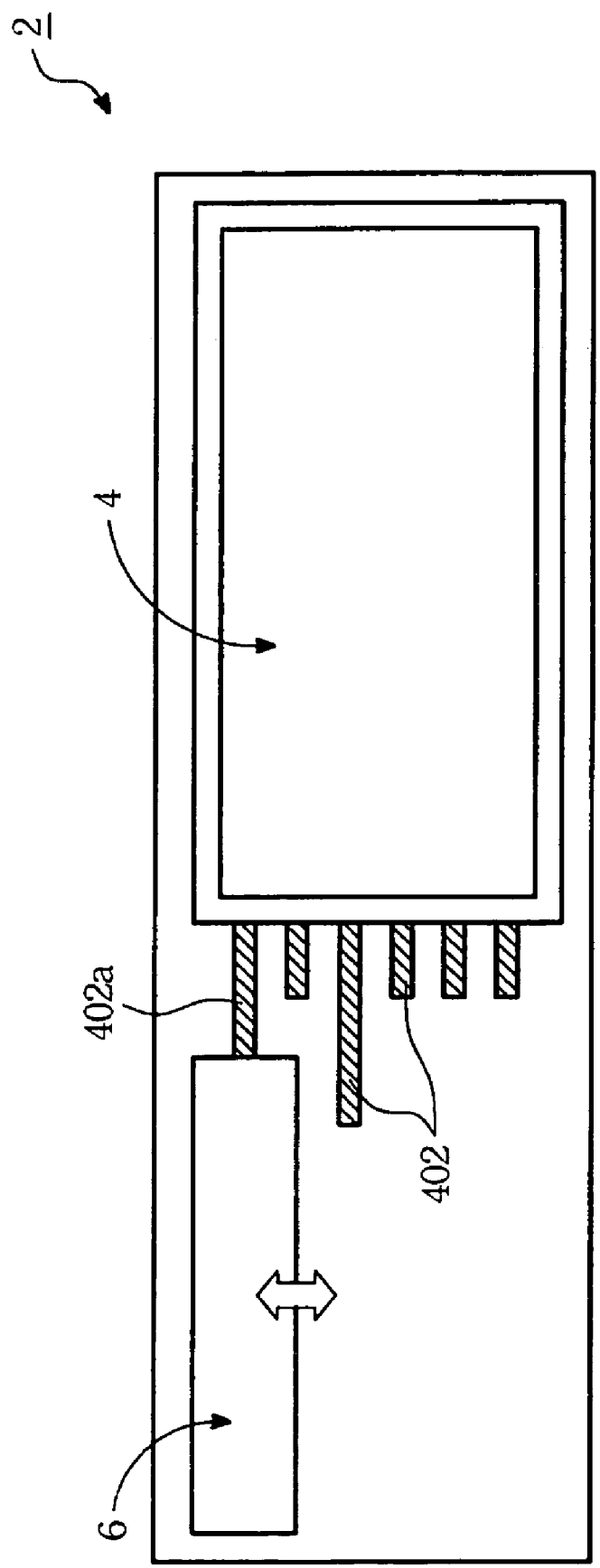
FIG. 3 schematically illustrates the cross-sectional view of a disk changer device in the prior art when inevitable shake happened to the disk changer device resulting in a severe operational damage.
Figure 4:
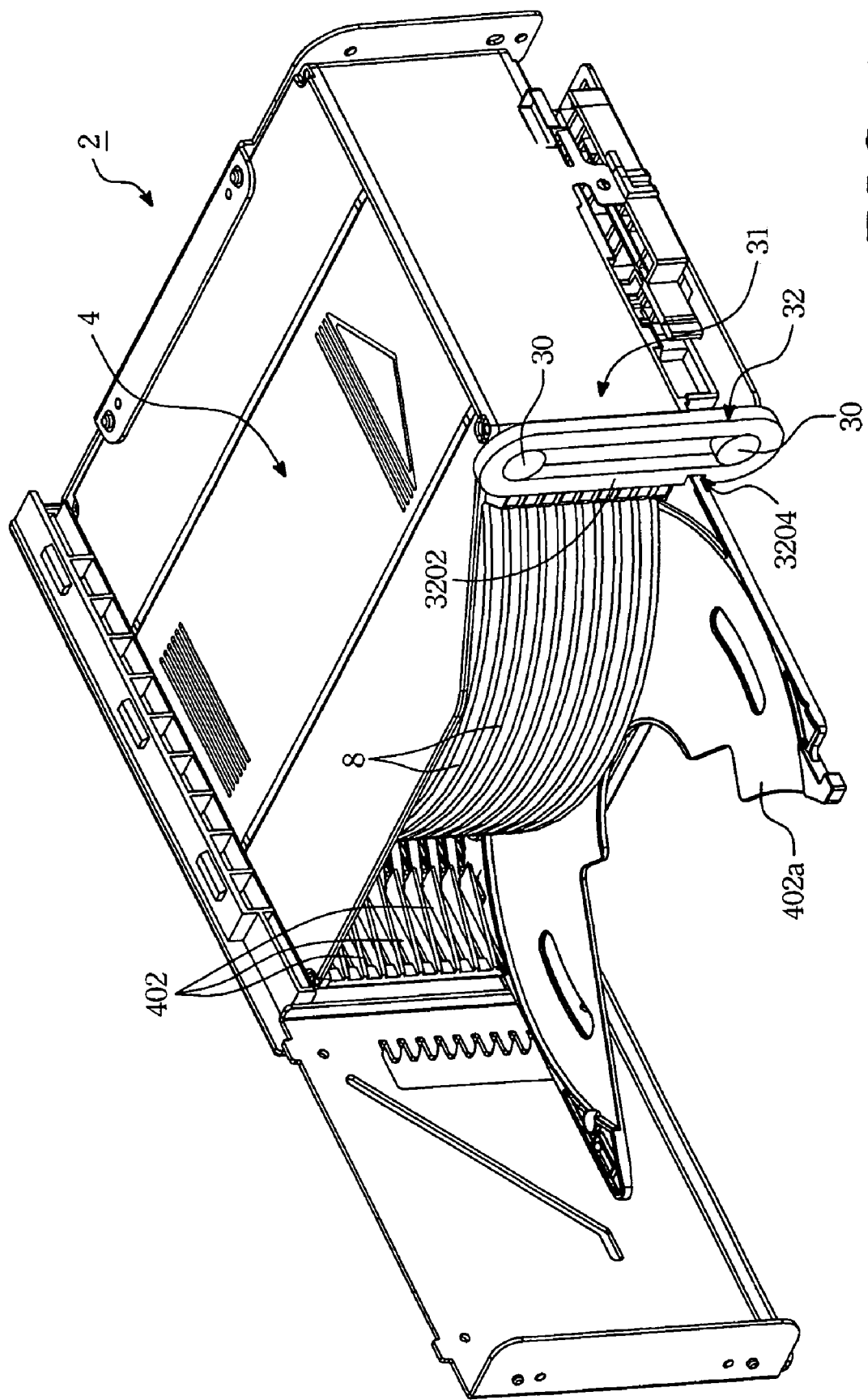
FIG. 4 schematically illustrates the isometric view of a processing mechanism containing a barrier mechanism in the present invention that utilized in a disk changer.

Please refer to FIG. 4, the barrier mechanism 31 in the preferred embodiment of the present invention used in combination with the disk changer 2 are illustrated in FIG. 4, wherein the disk changer 2 at least includes a magazine 4 and a processing mechanism 6 (also illustrated in FIG. 1), in addition, the magazine at least includes a plurality of disk holding members 402, and the processing mechanism 6 at least includes a drafting unit 602, an elevating unit 604 and a optical pick-up unit 606. The three units mentioned above are mechanically coupled, in detail, the elevating unit 604 are loaded with the drafting unit 602 and the optical pick-up unit 606. When the elevating unit 604 vertically moves to a predetermined position corresponding to one of the plurality of disk holding member 402, e.g., predetermined disk holding member 402a, then the drafting unit 602 horizontally draft the predetermined disk holding member 402a to a position corresponding to the optical pick-up unit 606, subsequently, the disk 8 on the predetermined disk holding member 402a is ready to be accessed by the optical pick-up unit 606, i.e., the optical pick-up unit 606 can read or write data from/to the disk 8 loaded on the predetermined disk holding member 402a.

The barrier mechanism 31 is installed on one edge in depth of the disk insertion opening of the magazine 4 as shown in FIG. 4, through that disk insertion opening, the plurality of disk holding member 402 can enter/leave the magazine 4. The barrier mechanism 31 at least includes two wheels 30 and a barrier belt loop 32, wherein the two wheels 30 are spinnably engaged to the barrier belt loop 32, i.e., the barrier belt loop 32 is slidably engaged to the two wheels 30 which can be spinnable. In addition, the two wheels 30 are respectively installed on top terminal and bottom terminal of that edge on the disk insertion opening of the magazine 4.

In spite of the spin of the two wheels 30, the engagement between the two wheels 30 and the barrier belt loop 32 make the barrier belt loop 32 rotate around the two wheels 30 corresponding to the spin of the two wheels 30. According to one preferred embodiment of the present invention, the barrier belt loop 32 includes an inner section 3202 which is a portion of the barrier belt loop 32 between the two wheels 32, and is adjacent to the disk insertion opening of magazine 4. The inner section 3202 is used to prevent any disk holding member 402 from unexpectedly moving out of the magazine 4. Besides, a traversing recess 3204 is formed in the inner section 3202, and the dimension of the traversing recess 3204 allows the plurality of disk holding member to pass, one at a time. The barrier belt loop 32 is mechanically coupled to the processing mechanism 6, such that the traversing recess 3204 and the optical pick-up unit 606 are on the same horizontal plane, thus the traversing recess 3204 can vertically move synchronously with the optical pick-up unit 606, and any one of the plurality of disk holding member 402 can be extracted from the magazine 4 when it is selected as the predetermined disk holding member 402a.

In detail, when the processing mechanism 6 vertically moves to a position such that the optical pick-up unit 606 and the predetermined disk holding member 402a are coplanar, simultaneously, the traversing recess 3204 are on the same horizontal plane as the predetermined disk holding member 402a, so the drafting unit 602 can extract the predetermined disk holding member 402a from the magazine 4 to the optical pick-up unit 606.

Figure 5:
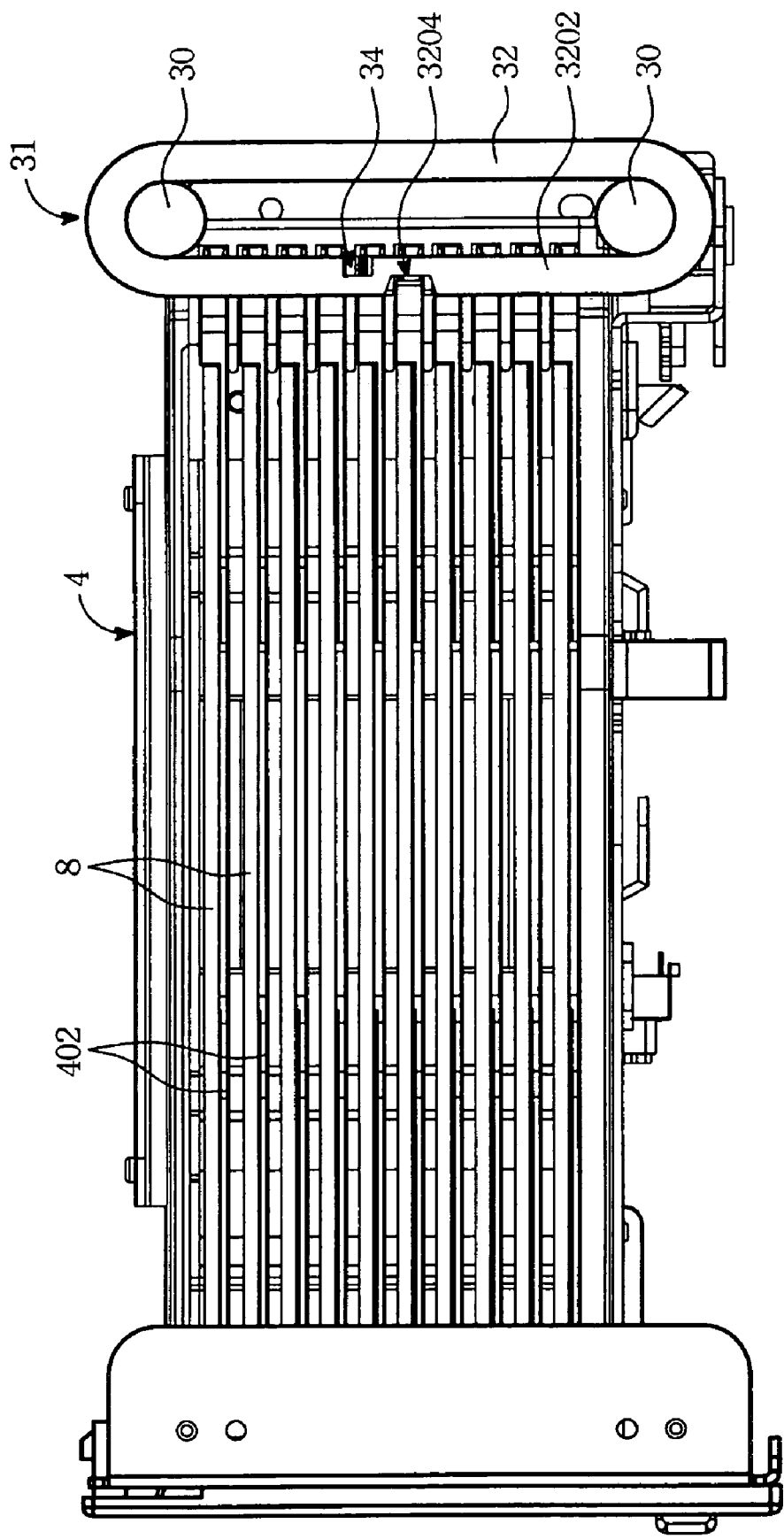
FIG. 5 schematically illustrates the front view of a barrier mechanism in the present invention, in combination with the magazine of the disk changer device.
Figure 6:
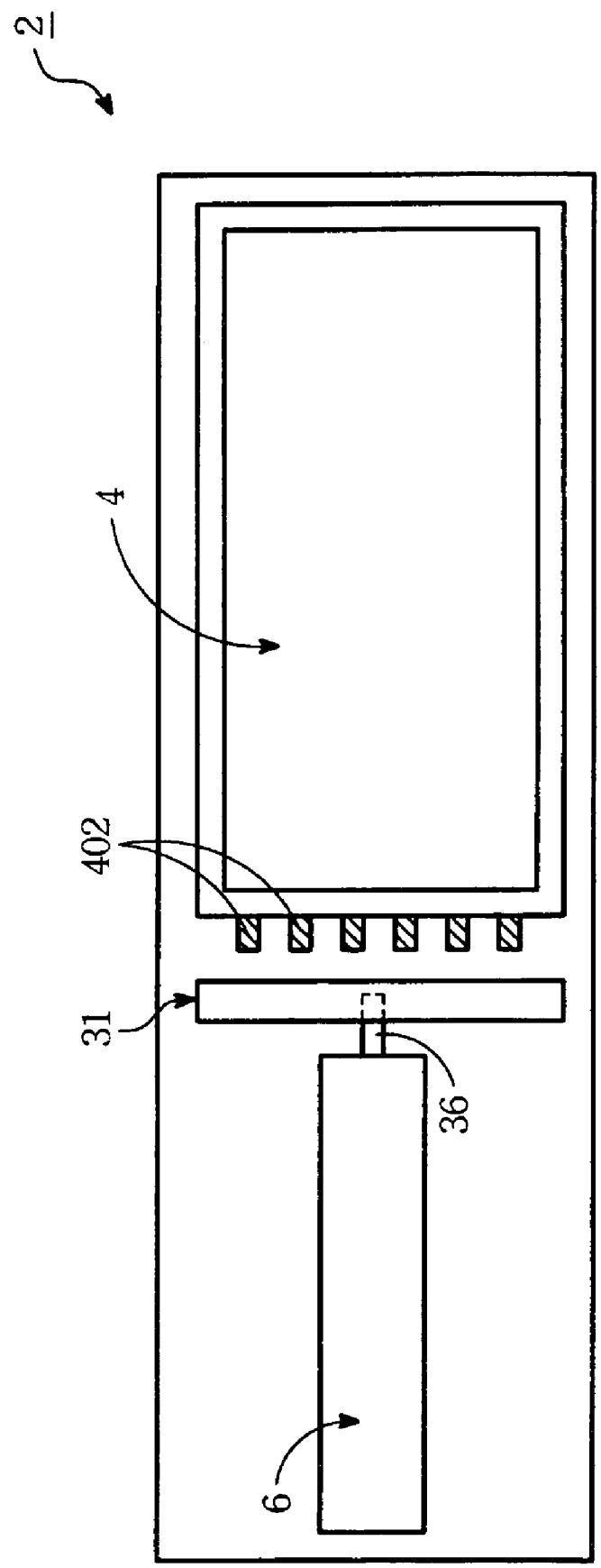
FIG. 6 schematically shows the cross-sectional view of a disk changer device according to the first embodiment of the present invention, in which a barrier mechanism according to the first preferred embodiment of the present invention is used in combination with the processing mechanism.

As for the coupling mechanism between the processing mechanism 6 and the barrier belt loop 32 of the barrier mechanism 31, the following description can be used to illustrate the embodiments of the present invention. FIG. 5 schematically illustrates the front view of the barrier mechanism 31 and the magazine 4, in which the plurality of disk holding member 402 are lodged in a stack manner. In FIG. 6, the processing mechanism 6 and the barrier mechanism 31 according to the first preferred embodiment of the present invention are mechanically coupled to the disk changer 2, and the side view concerning all the foregoing parts is schematically illustrated in FIG. 6.

As the barrier mechanism 31 mentioned above, the barrier belt loop 32 further includes a hooking recess 34, and the processing mechanism 6 further includes an interlocking bar 36. As shown in FIG. 6, one end of the interlocking bar 36 is fixed on the surface of the processing mechanism 6, the other end of the inter locking bar 36 fits into the hooking recess 34. Through the interlocking bar 36 and the hooking recess 34, the barrier belt loop 32 and the processing mechanism 6 are mechanically coupled together.

Figure 7:
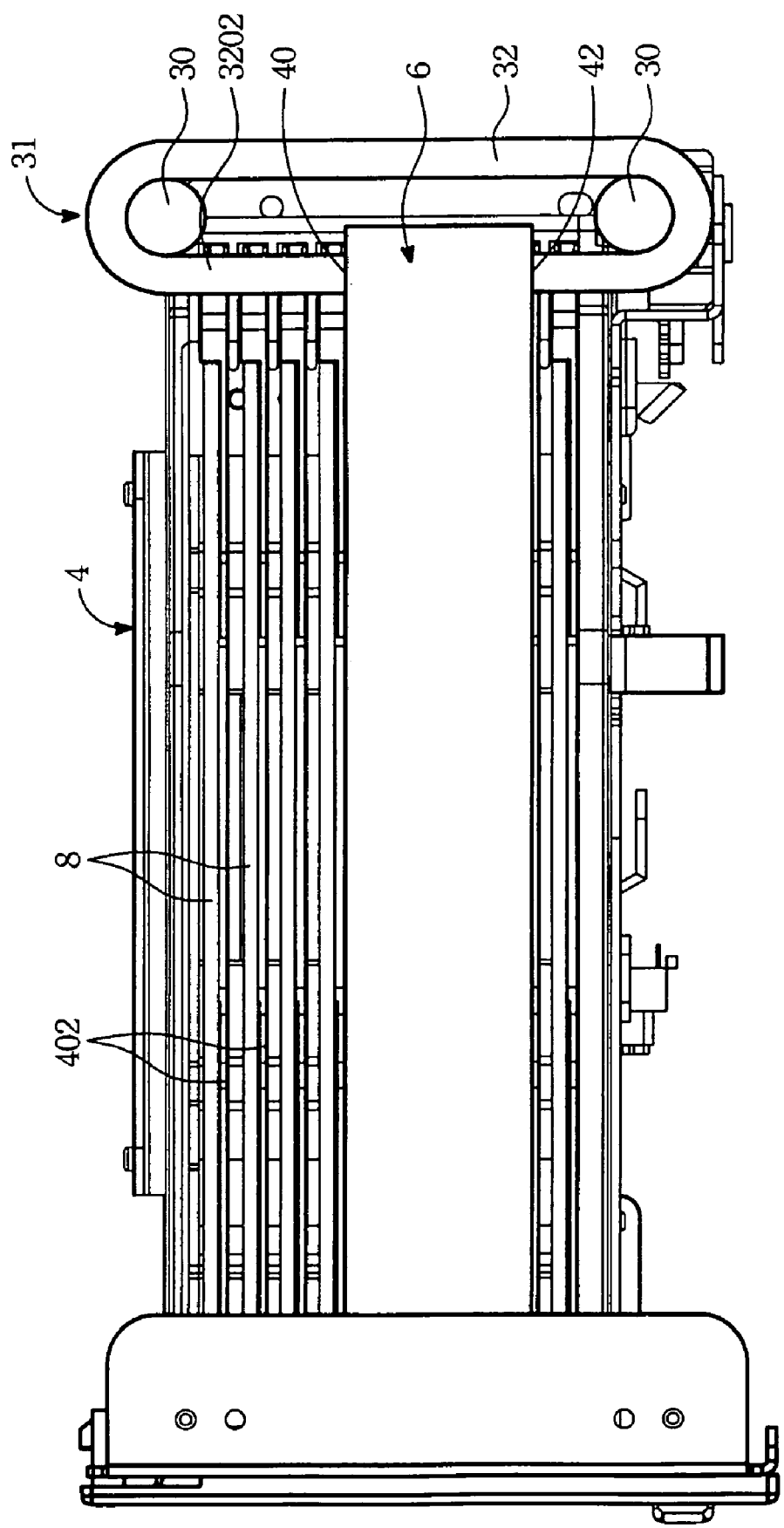
FIG. 7 schematically shows the front view of a disk changer device (including its' magazine) according to the second embodiment of the present invention, in which a barrier mechanism according to the second preferred embodiment of the present invention is used in combination with the processing mechanism.

Then please refer to FIG. 7, the processing mechanism 6 and the barrier mechanism 31 according to the second preferred embodiment of the present invention are mechanically coupled to the disk changer 2, and the front view concerning all the foregoing parts is schematically illustrated in FIG. 7. As the barrier mechanism 31 mentioned above, the barrier belt loop 32 is segmented and attached to the processing mechanism 6. Specifically, the first terminal 40 and the second terminal 42 of the segmented barrier belt loop 32 are attached to the top surface and bottom surface of the processing mechanism 6 respectively, thus the processing mechanism 6 is mechanically coupled to the barrier belt loop 32 of the barrier mechanism 31.

Figure 8:
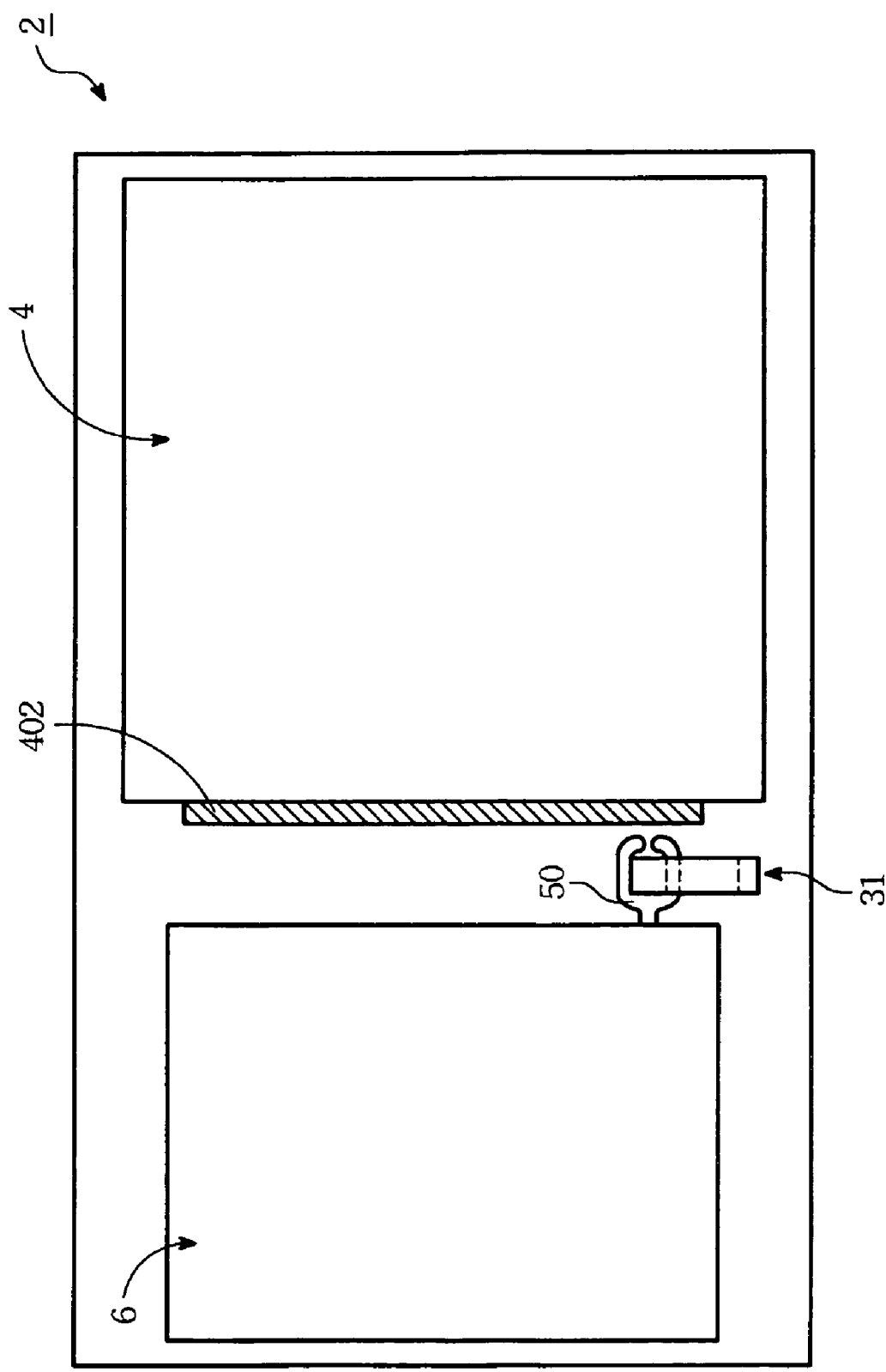
FIG. 8 schematically shows the top view of a disk changer device (including its' magazine and disk holding member) according to the third embodiment of the present invention, in which a barrier mechanism according to the third preferred embodiment of the present invention is used in combination with the processing mechanism.

In addition, please refer to FIG. 8, the processing mechanism 6 and the barrier mechanism 31 according to the third preferred embodiment of the present invention are mechanically coupled to the disk changer 2, and the over view concerning all the foregoing parts are schematically illustrated in FIG. 8. As the barrier mechanism 31 mentioned above, in detail, the processing mechanism 6 further includes a clamping arm 50 which has one end extends from and is attached to the processing mechanism 6, and the other end firmly clamping the barrier belt loop 32. Thus the processing mechanism 6 is mechanically coupled to the barrier belt loop 32 of the barrier mechanism 31.

From the foregoing description, because the barrier mechanism 31 utilized in the disk changer 2 according to the present invention, the presence of barrier belt loop 32 can tightly kept the plurality of disk holding member 402 in position within the magazine 4 even when the vehicle bearing the disk changer 2 was a slope positioned or was severely shocked for a long time. Sequentially, the plurality of disk holding member 402 completely prevents from unexpected slip away from the magazine 4 in any condition. In addition, with the traversing recess 3204, the predetermined disk holding member 402a, i.e., any of the plurality of disk holding member 402, can easily extracted from and inserted to the optical pick-up unit 606 as well as the magazine 4.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

I claim:

1. A disk changer device comprising a magazine and a processing mechanism, said magazine comprising a plurality of disk holding members, said processing mechanism comprising a drafting unit, an elevating unit and an optical pick-up unit, said elevating unit being loaded with said drafting unit and said optical pick-up unit, said elevating unit being used to vertically move said drafting unit and said optical pick-up unit to a predetermined position corresponding to a predetermined disk holding member of the plurality of disk holding members, said disk changer device comprising:

two wheels respectively installed on a top terminal and a bottom terminal on an edge of a disk insertion opening of said magazine; and a barrier belt loop for selectively traversing one of said plurality of disk holding members, said barrier belt loop being slidably engaged to said two wheels, wherein an inner section of said barrier belt loop comprises a traversing recess to be formed therein, said inner section being adjacent to said disk insertion opening of said magazine, mechanical coupling between said barrier belt loop and said processing mechanism enables said traversing recess constantly aligned with said optical pick-up unit, said traversing recess moving upwardly/downwardly following said processing mechanism wherein said processing mechanism vertically moves to a position that enabling said optical pick-up unit and said predetermined disk holding member to be horizontally coplanar, then said traversing recess being horizontally aligned with said predetermined disk holding member, thereby enabling said drafting unit to extract said predetermined disk holding member through said traversing recess into said optical pick-up unit.

2. The disk changer device of claim 1, wherein said barrier belt loop comprises a hooking recess, and said processing mechanism comprises an interlocking bar, one end of said interlocking bar being fixed on a surface of said processing mechanism, the other end of said inter locking bar fits into said hooking recess, through coupling between said interlocking bar and said hooking recess, said barrier belt loop and said processing mechanism being mechanically coupled together.

3. The disk changer device of claim 1, wherein said barrier belt loop is segmented and attached to said processing mechanism, a first terminal and a second terminal of the segmented barrier belt loop are attached to top surface and bottom surface of said processing mechanism respectively, thereby mechanically coupling said processing mechanism to said barrier belt loop of said barrier mechanism.

4. The disk changer device of claim 1, wherein said processing mechanism further comprises a clamping arm having one end extending from and attached to said processing mechanism, the other end of said clamping arm firmly clamping said barrier belt loop, thereby said processing mechanism being mechanically coupled to said barrier belt loop of said barrier mechanism.

5. A barrier mechanism utilized in a disk changer device, said disk changer comprising a magazine and a processing mechanism, said magazine comprising a plurality of disk holding members, said processing mechanism comprising a drafting unit, an elevating unit and an optical pick-up unit, said elevating unit being loaded with said drafting unit and said optical pick-up unit, said elevating unit being used to vertically move said drafting unit and said optical pick-up unit to a predetermined position corresponding to a predetermined disk holding member of the plurality of disk holding members, then said drafting unit being used to horizontally draft said predetermined disk holding member to a position corresponding to said optical pick-up unit, said barrier mechanism comprising:

at least one wheel installed on a top terminal or a bottom terminal on an edge of a disk insertion opening of said magazine; and a barrier belt loop for selectively traversing one of said plurality of disk holding members, said barrier belt loop being slidably engaged to said at least one wheel, wherein an inner section of said barrier belt loop comprises a traversing recess to be formed therein, said inner section being adjacent to said disk insertion opening of said magazine, mechanical coupling between said barrier belt loop and said processing mechanism enables said traversing recess constantly aligned with said optical pick-up unit, said traversing recess moving upwardly/downwardly following said processing mechanism, wherein said processing mechanism vertically moves to a position that enabling said optical pick-up unit and said predetermined disk holding member to be horizontally coplanar, then said traversing recess being horizontally aligned with said predetermined disk holding member, thereby enabling said drafting unit to extract said predetermined disk holding member through said traversing recess into said optical pick-up unit.

6. The barrier mechanism of claim 5, wherein said barrier belt loop comprises a hooking recess, and said processing mechanism comprises an interlocking bar, one end of said interlocking bar being fixed on a surface of said processing mechanism, the other end of said inter locking bar fits into said hooking recess, through coupling between said interlocking bar and said hooking recess, said barrier belt loop and said processing mechanism being mechanically coupled together.

7. The barrier mechanism of claim 5, wherein said barrier belt loop is segmented and attached to said processing mechanism, a first terminal and a second terminal of the segmented barrier belt loop are attached to top surface and bottom surface of said processing mechanism respectively, thereby mechanically coupling said processing mechanism to said barrier belt loop of said barrier mechanism.

8. The barrier mechanism of claim 5, wherein said processing mechanism further comprises a clamping arm having one end extending from and attached to said processing mechanism, the other end of said clamping arm firmly clamping said barrier belt loop, thereby said processing mechanism being mechanically coupled to said barrier belt loop of said barrier mechanism.

* * * * *